(12) United States Patent
Tomita et al.

(10) Patent No.: US 12,546,667 B2
(45) Date of Patent: Feb. 10, 2026

(54) TEMPERATURE MEASUREMENT DEVICE

(71) Applicant: MEKTEC CORPORATION, Tokyo (JP)

(72) Inventors: Shunsuke Tomita, Tokyo (JP); Kenichi Nakayama, Tokyo (JP); Tomoki Kanayama, Tokyo (JP)

(73) Assignee: MEKTEC CORPORATION, Tokyo (JP)

( * ) Notice: Subject to any disclaimer, the term of this patent is extended or adjusted under 35 U.S.C. 154(b) by 437 days.

(21) Appl. No.: 18/192,901

(22) Filed: Mar. 30, 2023

(65) Prior Publication Data
US 2023/0392994 A1 Dec. 7, 2023

(30) Foreign Application Priority Data

Jun. 2, 2022 (JP) ................... 2022-090206

(51) Int. Cl.
| | |
|---|---|
| *G01K 7/22* | (2006.01) |
| *G01K 1/08* | (2021.01) |
| *G01R 31/374* | (2019.01) |
| *G01R 31/3835* | (2019.01) |

(52) U.S. Cl.
CPC ............... *G01K 7/22* (2013.01); *G01K 1/08* (2013.01); *G01R 31/374* (2019.01); *G01R 31/3835* (2019.01)

(58) Field of Classification Search
CPC ........ G01K 7/22; G01K 1/08; G01R 31/3835; G01R 35/374
See application file for complete search history.

(56) References Cited

U.S. PATENT DOCUMENTS

| | | | | |
|---|---|---|---|---|
| 11,473,979 | B2* | 10/2022 | Takase | G01K 1/16 |
| 11,747,215 | B2* | 9/2023 | Watanabe | G01K 7/22 |
| | | | | 374/185 |
| 2013/0083326 | A1* | 4/2013 | Clark | G01K 1/16 |
| | | | | 374/185 |
| 2020/0333192 | A1 | 10/2020 | Takase et al. | |
| 2022/0404214 | A1* | 12/2022 | Tomita | G01K 1/18 |

FOREIGN PATENT DOCUMENTS

JP 2019-074327 A 5/2019

* cited by examiner

*Primary Examiner* — Kyung S Lee
(74) *Attorney, Agent, or Firm* — Studebaker Brackett PLLC

(57) ABSTRACT

Provided is a temperature measurement device which includes: a case; a flexible printed circuit board; and a thermistor element mounting portion, the case integrally has a first case portion, a second case portion, and a holding portion; the flexible printed circuit board has a trunk and a branch divided from the trunk; the trunk is fixed to a first surface of the first case portion; the thermistor element mounting portion is arranged in the branch and is fixed to a first surface of the second case portion; the second case portion is folded such that a second surface of the first case portion and a second surface of the second case portion are in contact with each other; and the holding portion holds a part of the branch between a portion divided from the trunk and a portion where the thermistor element mounting portion is arranged.

4 Claims, 8 Drawing Sheets

PRIOR ART

TEMPERATURE MEASUREMENT DEVICE

CROSS-REFERENCE TO RELATED APPLICATION

This application claims priority from Japanese Patent Application No. 2022-090206 filed with the Japan Patent Office on Jun. 2, 2022, the entire content of which is hereby incorporated by reference.

BACKGROUND

1. Technical Field

The present disclosure relates to a temperature measurement device.

2. Related Art

A battery including a plurality of cells, which is installed in, for example, electric vehicles and hybrid vehicles, includes a device for measuring a temperature of the battery (see, for example, JP-A-2019-74327). Generally, a voltage monitoring device for monitoring whether or not voltages of the plurality of cells are normal also has a function of measuring a temperature. Such a temperature measurement device according to the related art will be described with reference to FIG. 8. FIG. 8 is a simplified diagram illustrating a state in which the temperature measurement device according to the related art is attached to a battery. FIG. 8 illustrates the temperature measurement device as a schematic cross-sectional view.

A temperature measurement device 500 is provided on an upper surface of a battery including a plurality of cells 200. Support members 210 that support the cells 200 are provided between adjacent cells 200. The temperature measurement device 500 includes a flexible printed circuit board 510 and a case 520 to which the flexible printed circuit board 510 is fixed and which is fixed to the battery. In the temperature measurement device 500, a plurality of wires provided on the flexible printed circuit board 510 is separately used for voltage monitoring and for temperature measurement. The flexible printed circuit board 510 has a trunk 511 having a plurality of wires and a branch 512 divided from the trunk 511. The wire for temperature measurement is provided from the trunk 511 to the branch 512 and is electrically connected to a thermistor element 530 of a thermistor element mounting portion provided in the branch 512.

In the temperature measurement device 500 configured as described above, a part 512a of the branch 512 floats in the air. Therefore, vibrations are transmitted from a vehicle or the like in which the temperature measurement device 500 is installed, thereby vibrating the part 512a of the branch 512 (see an arrow V in FIG. 8). This vibration may cause cyclic stress or repeated contact with other members, which may lead to deterioration over time. Thus, the life of the temperature measurement device 500 may be shortened.

SUMMARY

A temperature measurement device according to an embodiment of the present disclosure is configured to include: a case that is fixed to an article to be measured; a flexible printed circuit board that is attached to the case; and a thermistor element mounting portion. The temperature measurement device is also configured such that: the case integrally has a first case portion, a second case portion, and a holding portion; the flexible printed circuit board has a trunk and a branch divided from the trunk; the trunk is fixed to a first surface of the first case portion; the thermistor element mounting portion is arranged in the branch and is fixed to a first surface of the second case portion; the second case portion is folded such that a second surface of the first case portion and a second surface of the second case portion are in contact with each other; and the holding portion holds a part of the branch between a portion divided from the trunk and a portion where the thermistor element mounting portion is arranged so as to restrain movement of the branch.

DETAILED DESCRIPTION

Figure 1:
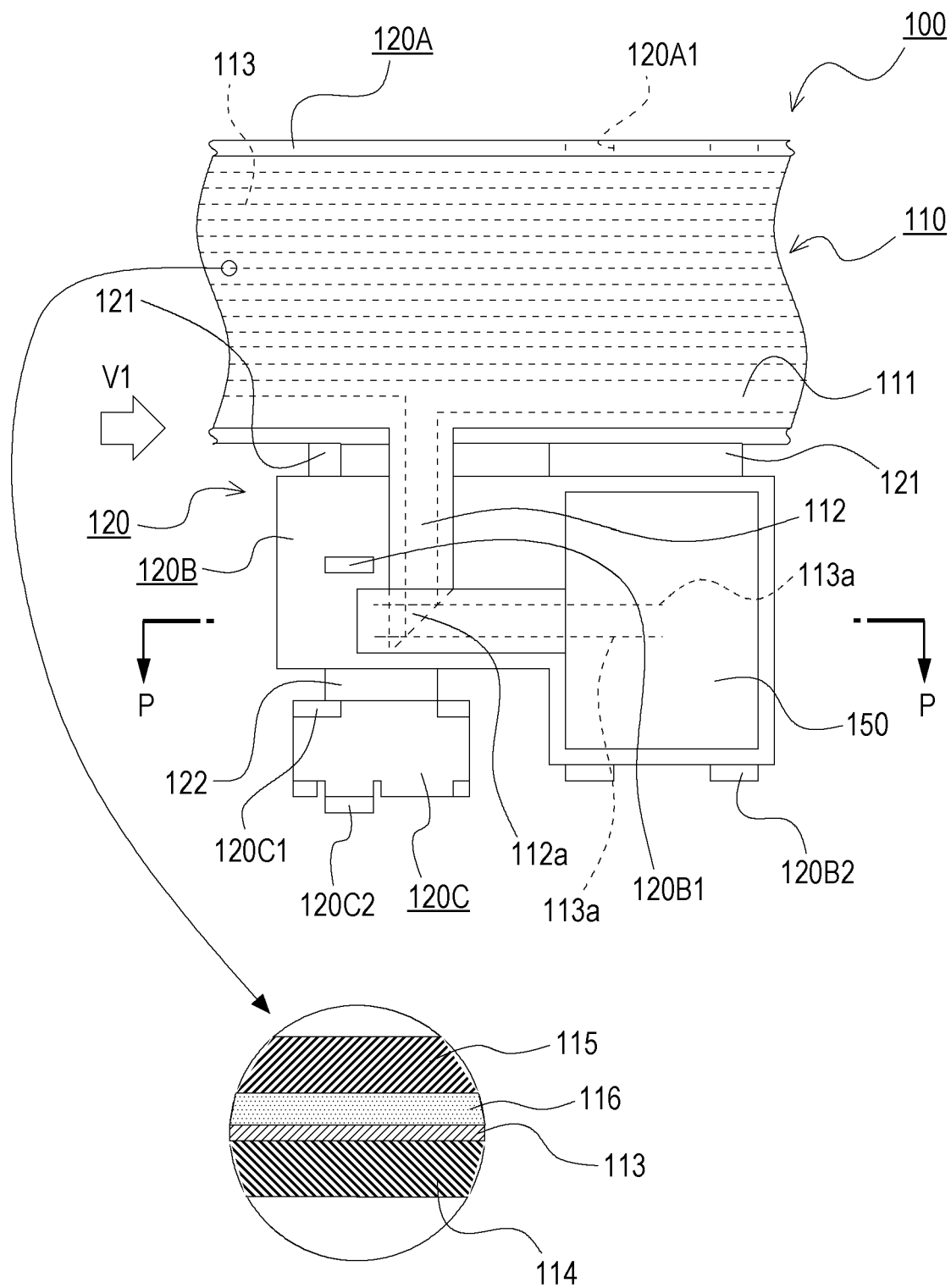
FIG. 1 is a schematic configuration diagram of a temperature measurement device according to Embodiment 1 of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An object of the present disclosure is to provide a temperature measurement device having enhanced durability.

The present disclosure adopts the following means.

A temperature measurement device according to an aspect of the present disclosure is configured to include: a case that is fixed to an article to be measured; a flexible printed circuit board that is attached to the case; and a thermistor element mounting portion. The temperature measurement device is also configured such that: the case integrally has a first case portion, a second case portion, and a holding portion; the flexible printed circuit board has a trunk and a branch divided from the trunk; the trunk is fixed to a first surface of the first case portion; the thermistor element mounting portion is arranged in the branch and is fixed to a first surface of the second case portion; the second case portion is folded such that a second surface of the first case portion and a second surface of the second case portion are in contact with each other; and the holding portion holds a part of the branch between a portion divided from the trunk and a portion where the thermistor element mounting portion is arranged so as to restrain movement of the branch.

According to the present disclosure, the part of the branch is held by the holding portion. This makes it possible to restrain swinging of the branch.

It is preferred that the holding portion includes a cover portion, the cover portion is connected to the second case portion by a hinge, and the cover portion is folded back by bending the hinge such that the part of the branch is stored in the cover portion.

With the above configuration, the part of the branch is held by the holding portion only by attaching the flexible printed circuit board to the case and then folding back the cover portion.

It is preferred that the holding portion has a pair of hooked holding portions; and the pair of hooked holding portions is provided on both sides of the branch in a transverse direction so as to allow movement of the branch in a direction closer to the surface of the second case portion and to restrict movement of the branch in a direction away from the surface of the second case portion.

With the above configuration, the part of the branch is held by the holding portion at the same time as the flexible printed circuit board is attached to the case.

It is also preferred that the flexible printed circuit board has not only a wire connected to a thermistor element but also a wire for measuring a voltage of the article to be measured.

As described above, the present disclosure can enhance durability.

Hereinafter, embodiments of the present disclosure will be explanatorily described in detail with reference to the drawings. However, dimensions, materials, shapes, and relative arrangement of components described in the embodiments do not limit the scope of the present disclosure unless otherwise noted. In the following embodiments, there will be described an example where a voltage monitoring device attached to a battery installed in an electric vehicle or the like also has a function of a temperature measurement device. However, the temperature measurement device according to the present disclosure is applicable to applications for measuring temperatures of various articles to be measured.

Embodiment 1

Figure 2A:
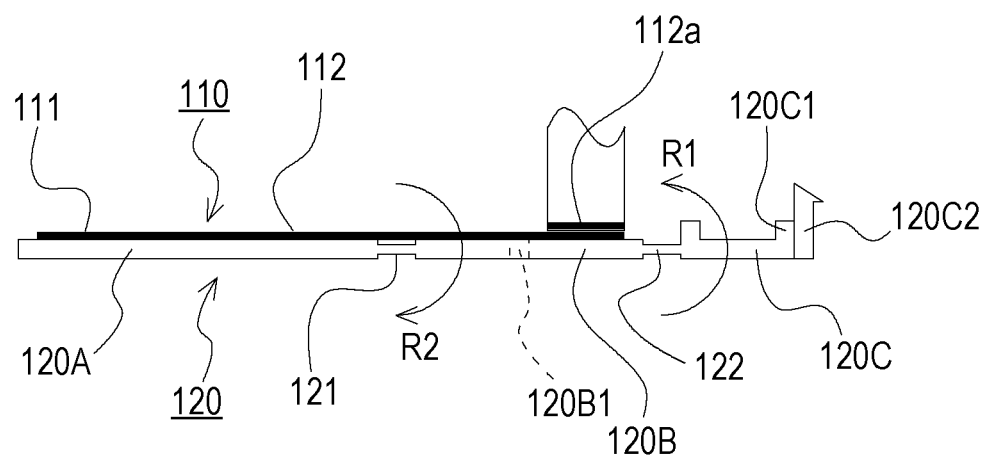
FIGS. 2A and 2B are assembly diagrams of the temperature measurement device according to Embodiment 1 of the present disclosure.
Figure 2B:
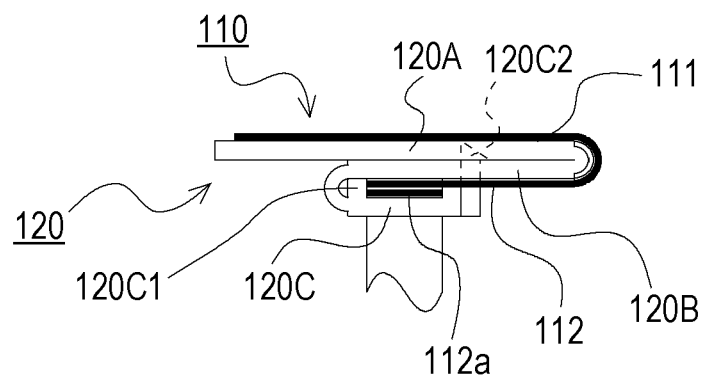
Figure 3A:
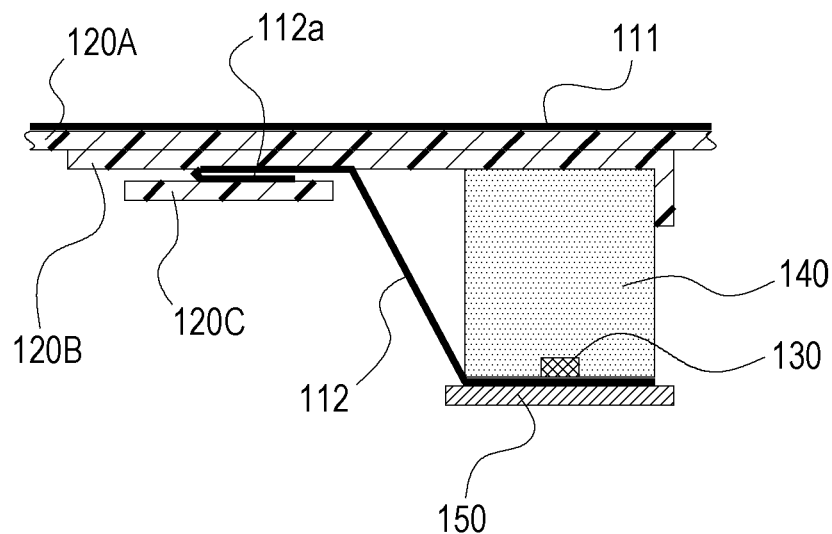
FIGS. 3A and 3B are schematic cross-sectional views of the temperature measurement device according to Embodiment 1 of the present disclosure.
Figure 3B:
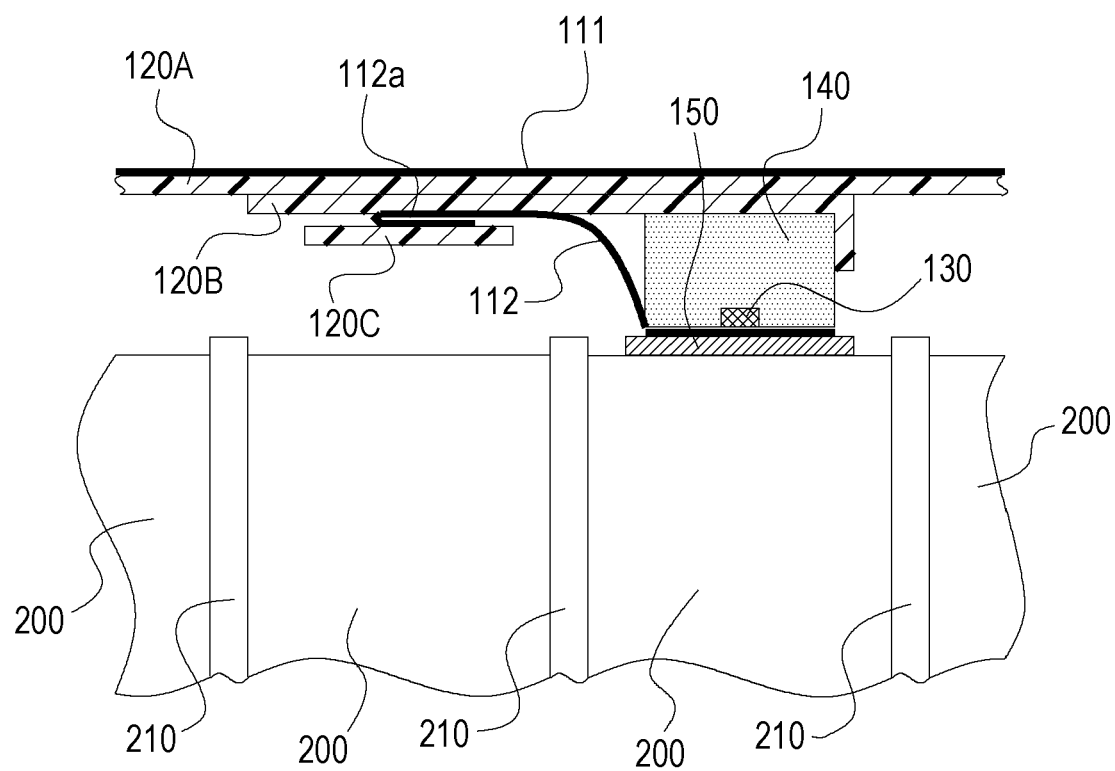

A temperature measurement device according to Embodiment 1 of the present disclosure will be described with reference to FIG. 1, FIGS. 2A and 2B, and FIGS. 3A and 3B. FIG. 1 is a schematic configuration diagram of the temperature measurement device according to Embodiment 1 of the present disclosure. An upper drawing of FIG. 1 illustrates a part of a simplified plan view of the temperature measurement device before a case is folded. A lower drawing of FIG. 1 illustrates a schematic cross-sectional view of the inside of a circled part in the plan view. FIGS. 2A and 2B are assembly diagrams of the temperature measurement device according to Embodiment 1 of the present disclosure. FIGS. 2A and 2B simply illustrate a positional relationship between the case and a flexible printed circuit board when the temperature measurement device is viewed in a direction of an arrow V1 in FIG. 1. FIG. 2A illustrates a state before the case is folded, and FIG. 2B illustrates a state after the case is folded. FIGS. 3A and 3B are schematic cross-sectional views of the temperature measurement device according to Embodiment 1 of the present disclosure. FIG. 3A illustrates a state before the temperature measurement device of which the case is folded is attached to a battery, and FIG. 3B illustrates a state after the temperature measurement device of which the case is folded is attached to the battery. Note that cross-sections of a thermistor element mounting portion, a branch on the flexible printed circuit board, and the like in FIGS. 3A and 3B correspond to a PP cross-sectional view in FIG. 1.

<Overview of Battery and Voltage Monitoring Device>

An overview of a battery and a voltage monitoring device also functioning as a temperature measurement device will be described. The battery includes a plurality of cells 200 and a plurality of support members 210 provided between adjacent cells 200 to support the cells 200 (see FIG. 3B). Although a detailed description of the battery is omitted, electrodes (one is a positive electrode and the other is a negative electrode) (not illustrated) are provided at both ends of an upper part of each cell 200. The plurality of cells 200 is arrayed such that the positive and negative electrodes are adjacent to each other. When the adjacent positive and negative electrodes are electrically connected by busbars (not illustrated) provided in the temperature measurement device 100, the plurality of cells 200 is connected in series.

A temperature measurement device 100 includes a resin case 120 fixed to an article to be measured (battery in the present embodiment) and a flexible printed circuit board (hereinafter, referred to as FPC 110) which is attached to the case 120. The temperature measurement device 100 also includes a thermistor element mounting portion. The thermistor element mounting portion according to the present embodiment includes a thermistor element 130 electrically connected to a wire provided in the FPC 110, an elastic body 140, and a heat collecting plate 150 (see FIG. 3B). Further, a connector (not illustrated) is attached to an end of the FPC 110. The connector is connected to a device (not illustrated) for measuring voltages and temperatures of the cells 200 included in the battery and for performing various kinds of control.

The temperature measurement device 100 is attached to an upper surface of the battery. Therefore, the heat collecting plate 150 in the thermistor element mounting portion is in contact with an upper surface of the cell 200 (see FIG. 3B). In the battery, voltages of all the cells 200 are monitored, whereas not all temperatures of the cells 200 are required to be monitored. Therefore, it is only necessary to provide the number of thermistor element mounting portions corresponding to the number of cells 200 provided in the battery and a usage environment thereof.

<Temperature Measurement Device>

The temperature measurement device 100 will be described in more detail. As described above, the temperature measurement device 100 includes the FPC 110, the case 120, and the thermistor element mounting portion. An example of a general structure of the FPC 110 will be briefly described below. The FPC 110 includes a base film 114, a plurality of wires 113 provided on the base film 114 and formed by etching copper foil, and a cover film 115 covering the plurality of wires 113. The cover film 115 is fixed to the base film 114 and the wires 113 by an adhesive 116 after the wires 113 are formed. In this structure (the structure illustrated as the cross-sectional view in the lower drawing of FIG. 1), copper foil (wires 113) is provided on only one surface of the base film 114, but the structure of the FPC 110 is not limited thereto. For example, a structure in which copper foil is provided on both surfaces of the base film 114 can also be adopted as in a modification example described below.

The FPC 110 has a trunk 111 having the plurality of wires 113 and a branch 112 divided from the trunk 111. The plurality of wires 113 includes a wire for measuring a voltage of an article to be measured and a wire 113a connected to the thermistor element 130. The wire 113a connected to the thermistor element 130 is arranged in the trunk 111 and the branch 112. Specifically, the wire 113a is provided from the trunk 111 to the branch 112. In the present embodiment, the thermistor element mounting portion is arranged at a tip end of the branch 112 in a state in which the branch 112 is folded at two bending portions (in a state in which the branch 112 is folded by being partially bent twice).

The case 120 according to the present embodiment integrally has a first case portion 120A to which the trunk 111 is fixed, a second case portion 120B to which the thermistor element mounting portion is fixed, and a cover portion 120C. The cover portion 120C serves as a holding portion that holds a part 112a of the middle of the branch 112 to restrain movement of the branch 112.

The part 112a of the middle of the branch 112 is a part of the branch 112 between a portion divided from the trunk 111 (a base portion of the trunk 111) and a portion where the thermistor element mounting portion is arranged. In the present embodiment, the thermistor element mounting portion is provided at a tip end of the branch 112. The part 112a of the middle of the branch 112 is preferably a part of the branch 112 at a predetermined distance from both the portion of the branch 112 divided from the trunk 111 and the portion of the branch 112 where the thermistor element mounting portion is arranged.

In the present embodiment, the part 112a of the middle of the branch 112 corresponds to a folded portion of the branch 112 folded at the above two bending portions.

The first case portion 120A and the second case portion 120B are connected by a hinge 121. The cover portion 120C serving as the holding portion is connected to the second case portion 120B by a hinge 122.

In the present embodiment, the FPC 110 is attached to the case 120, and then the cover portion 120C is folded back against the second case portion 120B so as to bend the hinge 122 (see an arrow R1 in FIG. 2A). Then, the second case portion 120B is folded back against the first case portion 120A so as to bend the hinge 121 (see an arrow R2 in FIG. 2A). Work of attaching the FPC 110 to the case 120 and work of folding back the cover portion 120C and the second case portion 120B can also be performed by using an automatic machine.

In the following description, a surface of the case 120 to which the FPC 110 is attached will be referred to as a front surface (first surface) of the case 120, and a surface opposite to the front surface will be referred to as a back surface (second surface) of the case 120. An upper side in FIG. 2A is a front surface side of the first case portion 120A, the second case portion 120B, and the cover portion 120C. The trunk 111 of the FPC 110 is fixed to the front surface (first surface) of the first case portion 120A. The thermistor element mounting portion is fixed to the front surface (first surface) of the second case portion 120B.

As described above, the cover portion 120C is first folded back such that the front surface (first surface) of the second case portion 120B and the front surface (first surface) of the cover portion 120C face each other (the arrow R1 in FIG. 2A). The second case portion 120B is then folded back such that the back surface (second surface) of the first case portion 120A and the back surface (second surface) of the second case portion 120B face each other (the arrow R2 in FIG. 2A).

Alternatively, the second case portion 120B is first folded back such that the back surface (second surface) of the first case portion 120A and the back surface (second surface) of the second case portion 120B face each other (the arrow R2 in FIG. 2A). The cover portion 120C is then folded back such that the front surface (first surface) of the second case portion 120B and the front surface (first surface) of the cover portion 120C face each other (the arrow R1 in FIG. 2A).

Thus, the second case portion 120B is folded such that the back surface (second surface) of the first case portion 120A and the back surface (second surface) of the second case portion 120B are in contact with each other (see FIGS. 2B and 3A).

Because the cover portion 120C is folded back so as to bend the hinge 122, the part 112a of the middle of the branch 112 is stored in the cover portion 120C. The cover portion 120C has a plurality of side walls 120C1 that abuts against the front surface of the second case portion 120B and is arranged on side surfaces of the branch 112 and an engagement projection 120C2. When the cover portion 120C is folded back, a tip end of the engagement projection 120C2 enters an engagement hole 120B1 provided in the second case portion 120B and engages with a portion surrounding the engagement hole 120B1. Therefore, the cover portion 120C is fixed to the second case portion 120B. A structure for fixing the cover portion 120C to the second case portion 120B is not limited to the above structure, and various known structures can be adopted.

The first case portion 120A and the second case portion 120B have engagement projections 120A1 and 120B2, respectively, and, when the second case portion 120B is folded back, the engagement projections 120A1 and 120B2 are engaged with each other. Therefore, the first case portion 120A and the second case portion 120B are fixed. A structure for fixing the first case portion 120A and the second case portion 120B is not limited to the above structure, and various known structures can be adopted.

In the thermistor element mounting portion, the elastic body 140 is attached to a portion of the branch 112 where the thermistor element 130 is provided so as to cover the thermistor element 130. The elastic body 140 can be made from a foam material such as rubber foam or urethane foam and can be attached to the branch 112 by using a double-sided tape or the like. The heat collecting plate 150 is provided on a back side of the portion of the branch 112 where the thermistor element 130 is provided. The heat collecting plate 150 is made from a plate material of aluminum or the like. The heat collecting plate 150 can be bonded to the branch 112 by a double-sided tape or the like.

As illustrated in FIG. 3A, the elastic body 140 of the thermistor element mounting portion (an upper surface of the elastic body 140 in FIG. 3A) is fixed to the second case portion 120B. A surface of the elastic body 140 (a lower surface thereof in FIG. 3A), which is opposite to the surface fixed to the second case portion 120B, is attached to the tip end of the branch 112.

The temperature measurement device 100 is attached to the battery in a state in which the thermistor element mounting portion is attached to the second case portion 120B and the case 120 is folded. When the temperature measurement device 100 is attached to the battery, the elastic body 140 is elastically compressed (see FIG. 3B). Therefore, even if there are dimensional errors in various components, the heat collecting plate 150 can be in proper contact with the upper surface of the cell 200.

Excellent Points of Temperature Measurement Device According to Present Embodiment In the temperature measurement device 100 according to the present embodiment, the case 120 has the cover portion 120C that holds the part 112a of the middle of the branch 112 to restrain the movement of the branch 112. This makes it possible to restrain swinging of the branch 112. Thus, in a case where the temperature measurement device 100 is installed in an electric vehicle or the like, swinging of the branch 112 is restrained even if vibrations are transmitted from a vehicle body to the temperature measurement device 100. This restrains cyclic stress of the branch 112 and repeated contact thereof with other members, thereby restraining deterioration of the branch 112 over time. Therefore, it is possible to enhance durability of the temperature measurement device 100.

The cover portion 120C is connected to the second case portion 120B by the hinge 122. When the cover portion 120C is folded back so as to bend the hinge 122, the part 112a of the middle of the branch 112 is stored in the cover portion 120C. Therefore, the part 112a of the middle of the branch 112 is held by the cover portion 120C only by attaching the FPC 110 to the case 120 and then folding back the cover portion 120C. Accordingly, the work of attaching the FPC 110 to the case 120 and the work of folding back the cover portion 120C are easy, and thus the above work can also be performed by an automatic machine.

Modification Example of Embodiment 1

A temperature measurement device according to a modification example of Embodiment 1 of the present disclosure will be described with reference to FIG. 4. In Embodiment 1, a configuration in which a so-called single-sided FPC is adopted has been described, whereas, in the present modification example, a configuration in which a double-sided FPC is adopted will be described. Other configurations and actions are the same as those in Embodiment 1, and thus the same components will be denoted by the same reference signs, and description thereof will be omitted as appropriate.

Figure 4:
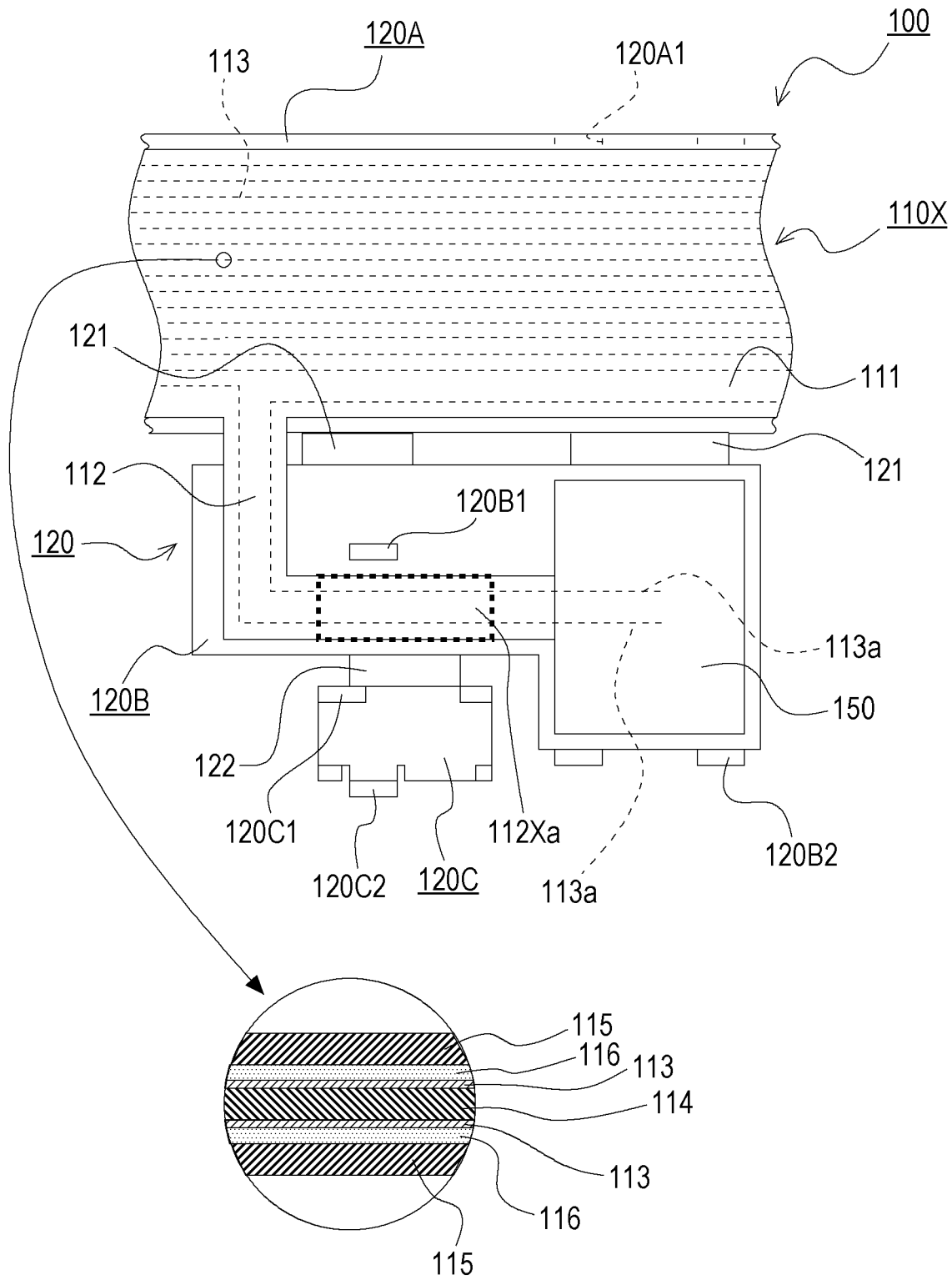
FIG. 4 is a schematic configuration diagram of a temperature measurement device according to a modification example of Embodiment 1 of the present disclosure.

FIG. 4 is a schematic configuration diagram of a temperature measurement device according to a modification example of Embodiment 1 of the present disclosure. An upper drawing of FIG. 4 illustrates a part of a simplified plan view of the temperature measurement device before a case is folded. A lower drawing of FIG. 4 illustrates a schematic cross-sectional view of the inside of a circled part in the plan view.

The FPC 110 in Embodiment 1 is a so-called single-sided FPC, and copper foil (the wires 113 formed by etching copper foil) is provided on only one surface of the base film 114. In the single-sided FPC, the branch 112 needs to be folded at two bending portions. Meanwhile, in a case where a double-sided FPC is adopted, no folding portion needs to be provided in the branch 112. Hereinafter, a configuration obtained by adopting the double-sided FPC will be described with reference to FIG. 4.

Also in the present modification example, the temperature measurement device 100 includes an FPC 110X, the case 120, and the thermistor element mounting portion. Because the case 120 and the thermistor element mounting portion are as described in Embodiment 1, description thereof will be omitted. Note that, because a shape of the FPC 110X is different from that in Embodiment 1, the case 120 is also partially different from that in Embodiment 1, but a basic configuration and action thereof are the same as those in Embodiment 1.

The FPC 110X according to the present modification example includes the wires 113, a layer of the adhesive 116, and the cover film 115 on both sides of the base film 114 (see the lower drawing of FIG. 4). The wires 113 are formed by etching copper foil as described above. A basic configuration of the FPC 110X according to the present modification example is the same as that of the FPC 110 in Embodiment 1, except that the FPC 110X is a double-sided FPC. The FPC 110X has the trunk 111 and the branch 112. The plurality of wires 113 includes the wire for measuring a voltage of an article to be measured and the wire 113a connected to the thermistor element 130. The wire 113a connected to the thermistor element 130 is arranged in the trunk 111 and the branch 112. Specifically, the wire 113a is provided from the trunk 111 to the branch 112. In the present modification example, the branch 112 is not folded unlike Embodiment 1, and the thermistor element mounting portion is arranged at the tip end of the branch.

A method and work of folding back the case 120 are as described in Embodiment 1. The present modification example is different from Embodiment 1 in that a part 112Xa of the middle of the branch 112 stored in the cover portion 120C is not a folded portion. In the present modification example, the part 112Xa of the middle of the branch 112 corresponds to a part surrounded by a thick dotted line in FIG. 4.

It is needless to say that the present modification example configured as described above also has the same effects as Embodiment 1.

Embodiment 2

A temperature measurement device according to Embodiment 2 of the present disclosure will be described with reference to FIG. 5 and FIGS. 6A and 6B. In the present embodiment, a case where a part of the configuration of the case is different from the configuration in Embodiment 1 will be described. Other configurations and actions are the same as those in Embodiment 1, and thus the same components will be denoted by the same reference signs, and description thereof will be omitted as appropriate.

Figure 5:
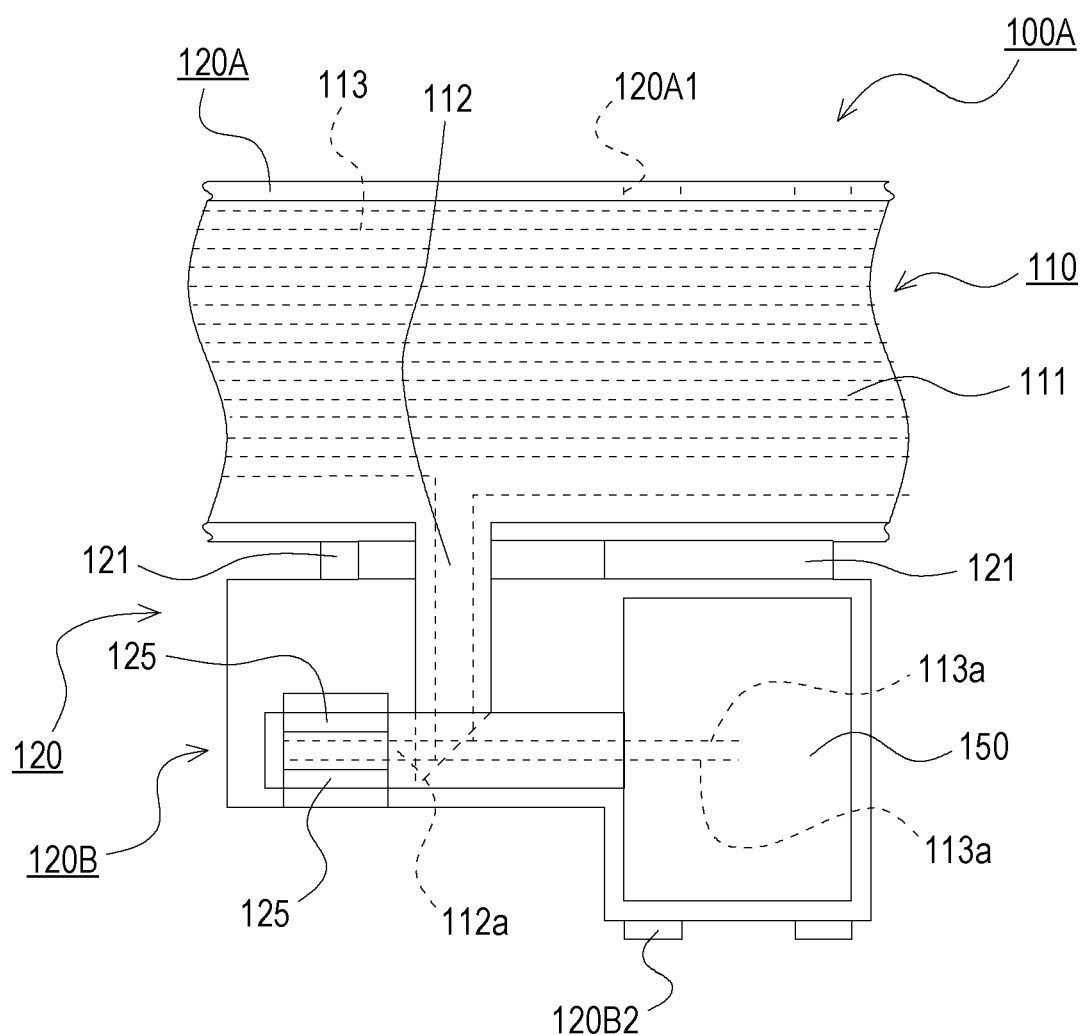
FIG. 5 is a schematic configuration diagram of a temperature measurement device according to Embodiment 2 of the present disclosure.

FIG. 5 is a schematic configuration diagram of the temperature measurement device according to Embodiment 2 of the present disclosure. FIG. 5 illustrates a part of a simplified plan view of the temperature measurement device before a case is folded. FIGS. 6A and 6B are assembly diagrams of the temperature measurement device according to Embodiment 2 of the present disclosure. FIG. 6A illustrates a state in which an FPC is being attached to the case, and FIG. 6B illustrates a state after the FPC is attached to the case. Left drawings of FIGS. 6A and 6B illustrate a main part of the device viewed from above. Middle drawings of FIGS. 6A and 6B illustrate the main part of the device viewed in a direction of an arrow V2 in the left drawing of FIG. 6A, and right drawings thereof illustrate the main part of the device viewed in a direction of an arrow V3 in the left drawing of FIG. 6A.

An overview of a battery and a voltage monitoring device also functioning as a temperature measurement device is as described in Embodiment 1, and thus description thereof will be omitted.

<Temperature Measurement Device>

A temperature measurement device 100A in the present embodiment also includes a resin case 120 fixed to an article to be measured (battery in the present embodiment), an FPC 110 attached to the case 120, and a thermistor element mounting portion.

A basic configuration of the FPC 110 and a configuration of the thermistor element mounting portion are as described in Embodiment 1.

The case 120 according to the present embodiment integrally has a first case portion 120A to which a trunk 111 is fixed and a second case portion 120B to which the thermistor element mounting portion is fixed. The second case portion 120B is integrally provided with a pair of hooked holding portions 125. The pair of hooked holding portions 125 serves as a holding portion that holds a part 112a of the middle of a branch 112 to restrain movement of the branch 112. Also in the present embodiment, the part 112a of the middle of the branch 112 corresponds to the folded portion of the branch 112 folded at the two bending portions described in Embodiment 1.

The pair of hooked holding portions 125 is arranged on both sides of the branch 112 in a transverse direction. The pair of hooked holding portions 125 allows movement of the branch 112 in a direction closer to a front surface 120B3 of the second case portion 120B and restricts movement of the branch 112 in a direction away from the front surface 120B3 of the second case portion 120B. That is, the pair of hooked holding portions 125 is arranged such that hooked bent portions face each other. This allows the branch 112 to pass between the pair of hooked holding portions 125 such that the branch is closer to the front surface 120B3 of the second case portion 120B. Meanwhile, when the branch 112 attempts to move away from the surface 120B3 of the second case portion 120B, the branch 112 is caught by hooked portions of the hooked holding portions 125. Therefore, the movement of the branch 112 in the direction away from the surface 120B3 of the second case portion 120B is restricted. In order to allow the branch 112 to easily pass between the pair of hooked holding portions 125 such that the branch 112 is closer to the surface 120B3 of the second case portion 120B, upper surfaces of the hooked portions are desirably inclined, as illustrated in the middle drawings of FIGS. 6A and 6B.

Figure 6A:
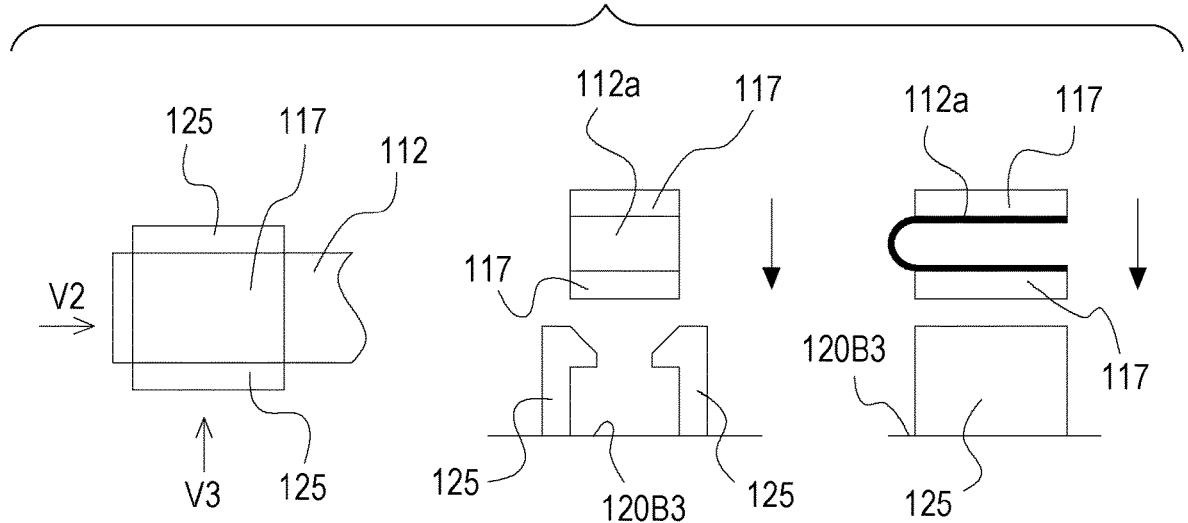
FIGS. 6A and 6B are assembly diagrams of the temperature measurement device according to Embodiment 2 of the present disclosure.
Figure 6B:
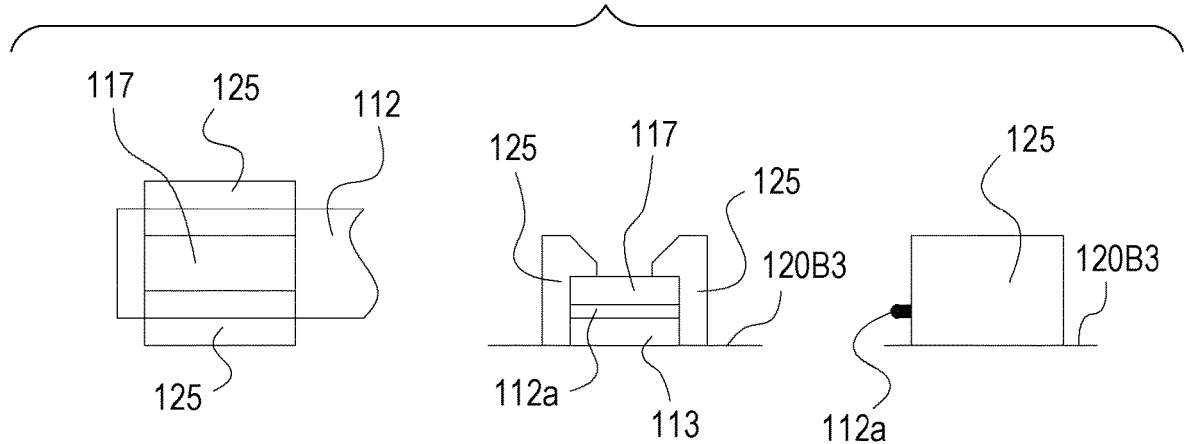

As illustrated in FIGS. 6A and 6B, by moving the part 112a of the middle of the branch 112 downward from above in FIGS. 6A and 6B and fitting the part between the pair of hooked holding portions 125, the part 112a can be held by the pair of hooked holding portions 125. Here, the FPC 110 is highly flexible. Therefore, in order to facilitate work of fitting the part 112a between the pair of hooked holding portions 125 and to more securely restrain the part 112a from falling out from the pair of hooked holding portions 125, a pair of reinforcing plates 117 is desirably provided so as to sandwich the part 112a of the folded branch 112 from both sides as in the present embodiment. This enhances rigidity of a portion around the part 112a, thereby facilitating the above work and more reliably restraining the part 112a from falling out from the pair of hooked holding portions 125.

Also in the present embodiment, the first case portion 120A and the second case portion 120B are connected by a hinge 121. Although not specifically illustrated, the second case portion 120B is folded back against the first case portion 120A so as to bend the hinge 121 after the FPC 110 is attached to the case 120 as in Embodiment 1. A structure of fixing the first case portion 120A and the second case portion 120B is also as described in Embodiment 1.

The temperature measurement device 100A according to the present embodiment configured as described above also has the same effects as that of Embodiment 1. In the present embodiment, the part 112a of the middle of the branch 112 is held by the pair of hooked holding portions 125 at the same time as the FPC 110 is attached to the case 120. Therefore, it is possible to further facilitate the attaching work (assembly work), as compared with Embodiment 1. As a matter of course, the work can also be performed by an automatic machine.

Modification Example of Embodiment 2

A temperature measurement device according to a modification example of Embodiment 2 of the present disclosure will be described with reference to FIG. 7. In Embodiment 2, a configuration in which a so-called single-sided FPC is adopted has been described, whereas, in the present modification example, a configuration in which a double-sided FPC is adopted will be described. Other configurations and actions are the same as those in Embodiment 2, and thus the same components will be denoted by the same reference signs, and description thereof will be omitted as appropriate.

Figure 7:
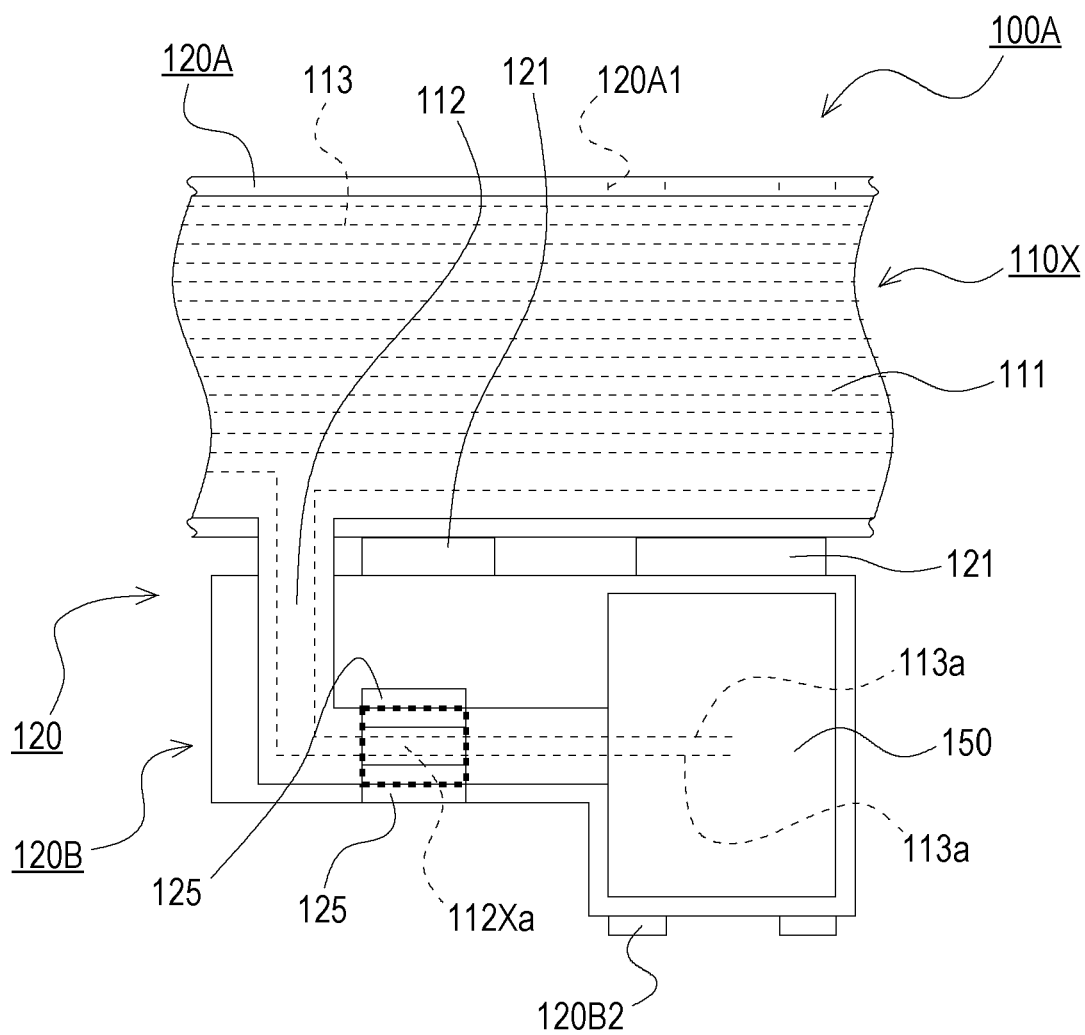
FIG. 7 is a schematic configuration diagram of a temperature measurement device according to a modification example of Embodiment 2 of the present disclosure.
Figure 8:
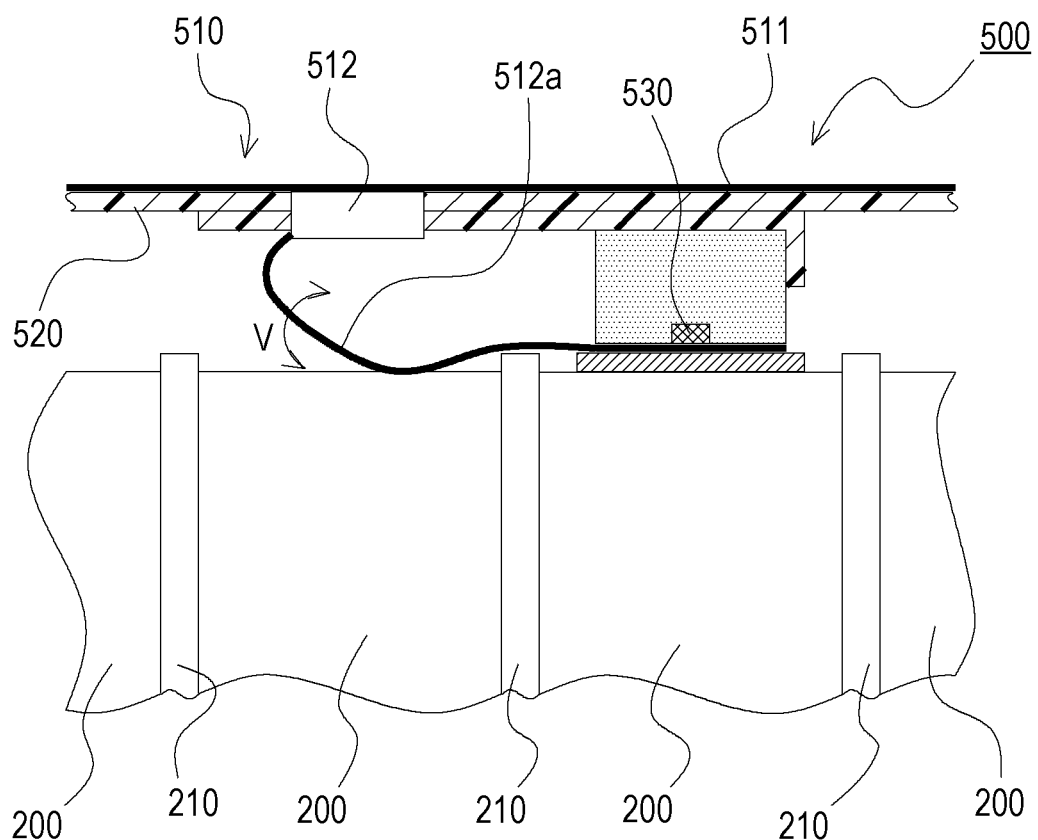
FIG. 8 is a simplified diagram illustrating a state in which a temperature measurement device according to a related art is attached to a battery.

FIG. 7 is a schematic configuration diagram of the temperature measurement device according to the modification example of Embodiment 2 of the present disclosure. FIG. 7 illustrates a part of a simplified plan view of the temperature measurement device before a case is folded.

The FPC 110 in Embodiment 2 is a so-called single-sided FPC, and copper foil (the wires 113 formed by etching copper foil) is provided on only one surface of the base film 114. In the single-sided FPC, the branch 112 needs to be folded at two bending portions. Meanwhile, in a case where a double-sided FPC is adopted, no folding portion needs to be provided in the branch 112. A configuration obtained by adopting the double-sided FPC will be described below with reference to FIG. 7.

Also in the present modification example, the temperature measurement device 100 includes an FPC 110X, the case 120, and the thermistor element mounting portion. Because the case 120 and the thermistor element mounting portion are as described in Embodiment 1, description thereof will be omitted. Note that, because a shape of the FPC 110X is different from that of Embodiment 2, the case 120 is also partially different from that in Embodiment 2, but a basic configuration and action thereof are the same as those in Embodiment 2.

An internal configuration of the FPC 110X according to the present modification example is as described in the modification example of Embodiment 1. A basic configuration of the FPC 110X according to the present modification example is the same as that of the FPC 110 in Embodiment 2, except that the FPC 110X is a double-sided FPC. The FPC 110X has the trunk 111 and the branch 112. The plurality of wires 113 includes the wire for measuring a voltage of an article to be measured and the wire 113a connected to the thermistor element 130. The wire 113a connected to the thermistor element 130 is arranged in the trunk 111 and the branch 112. Specifically, the wire 113a is provided from the trunk 111 to the branch 112. In the present modification example, the trunk 111 is not folded unlike the above embodiment, and the thermistor element mounting portion is arranged at the tip end of the trunk.

A method and work of folding back the case 120 are as described in the above embodiment. The present modification example is different from the above embodiment in that a part 112Xa of the middle of the branch 112 held by the pair of hooked holding portions 125 is not a folded portion. In the present modification example, the part 112Xa of the middle of the branch 112 corresponds to apart surrounded by a thick dotted line in FIG. 7. In Embodiment 2, the pair of reinforcing plates 117 is desirably provided so as to sandwich the part 112a of the middle of the branch 112 from both the sides as described above. Also in the present modification example, a reinforcement plate is desirably provided. However, in the present modification example, it is only necessary to provide a reinforcing plate only on one surface because the portion 112Xa of the middle of the branch 112 held by the pair of hooked holding portions 125 is not a folded portion.

It is needless to say that the present modification example configured as described above also has the same effects as Embodiment 2.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A temperature measurement device comprising:
a case that is fixed to an article to be measured;
a flexible printed circuit board that is attached to the case; and
a thermistor element mounting portion, wherein:
the case integrally has a first case portion, a second case portion, and a holding portion;
the flexible printed circuit board has a trunk and a branch divided from the trunk;
the trunk is fixed to a first surface of the first case portion;
the thermistor element mounting portion is arranged in the branch and is fixed to a first surface of the second case portion;
the second case portion is folded such that a second surface of the first case portion and a second surface of the second case portion are in contact with each other; and
the holding portion holds a part of the branch between a portion divided from the trunk and a portion where the thermistor element mounting portion is arranged so as to restrain movement of the branch.

2. The temperature measurement device according to claim 1, wherein:
the holding portion includes a cover portion; and
the cover portion is connected to the second case portion by a hinge, and the cover portion is folded back by bending the hinge such that the part of the branch is stored in the cover portion.

3. The temperature measurement device according to claim 1, wherein:
the holding portion has a pair of hooked holding portions; and
the pair of hooked holding portions is provided on both sides of the branch in a transverse direction so as to allow movement of the branch in a direction closer to the surface of the second case portion and to restrict movement of the branch in a direction away from the surface of the second case portion.

4. The temperature measurement device according to claim 1, wherein
the flexible printed circuit board has not only a wire connected to a thermistor element but also a wire for measuring a voltage of the article to be measured.

* * * * *